United States Patent

Chang et al.

[11] Patent Number: 5,690,570
[45] Date of Patent: Nov. 25, 1997

[54] MULTISTAGE SPROCKET ASSEMBLY FOR A BICYCLE

[75] Inventors: Mickey Wen-pin Chang, Fengyuan; Ti-li Ueng, Taichung, both of Taiwan

[73] Assignee: Industrial Development Bureau, Taipei, Taiwan

[21] Appl. No.: 533,848

[22] Filed: Sep. 26, 1995

[51] Int. Cl.[6] .................................................. B62M 11/02
[52] U.S. Cl. ........................ 474/158; 474/160; 474/164
[58] Field of Search ........................ 474/78, 158, 160, 474/164; 280/261

[56] References Cited

U.S. PATENT DOCUMENTS

| | | | |
|---|---|---|---|
| 4,268,259 | 5/1981 | Segawa et al. | 474/160 |
| 4,348,200 | 9/1982 | Terada | 474/160 |
| 5,078,653 | 1/1992 | Nagano | 474/160 X |
| 5,085,621 | 2/1992 | Nagano | 474/160 |
| 5,087,226 | 2/1992 | Nagano | 474/160 |
| 5,123,878 | 6/1992 | Nagano | 474/160 |
| 5,162,022 | 11/1992 | Kobayashi | 474/160 X |
| 5,188,569 | 2/1993 | Kobayashi | 474/160 |
| 5,192,250 | 3/1993 | Kobayashi | 474/160 X |

*Primary Examiner*—Roger J. Schoeppel
*Attorney, Agent, or Firm*—Jones, Day, Reavis & Pogue

[57] ABSTRACT

A sprocket assembly includes a larger diameter sprocket having a plurality of teeth formed on an outer periphery thereof, and a smaller diameter sprocket having a plurality of teeth formed on an outer periphery thereof. A driving chain meshes with the plurality of teeth of the smaller diameter sprocket and is able to shift from a first center of a space defined between the teeth of one pair of adjacent teeth located at the smaller diameter sprocket to a second center of a space defined between the teeth of one pair of adjacent teeth located at the larger diameter sprocket. A distance between the first and second centers is made not equal to an integer multiple of the pitch of the driving chain such that the driving chain is bent between the first and second centers and is deflected from a moving direction thereof which is along a tangent line drawn from the first center of the smaller diameter sprocket, and such that the driving chain has a deflection point relative to the first and second centers.

2 Claims, 3 Drawing Sheets

MULTISTAGE SPROCKET ASSEMBLY FOR A BICYCLE

BACKGROUND OF THE INVENTION

1. Field of Invention

The present invention relates to a multistage sprocket assembly, and more particularly to a multistage sprocket assembly for a bicycle.

2. Related Prior Art

The closest prior art of a multistage sprocket assembly for a bicycle was disclosed in Nagano's U.S. Pat. No. 4,268,259, filed on 08/17/1978.

The present invention has arisen to mitigate and/or obviate the disadvantage of the conventional multistage sprocket assembly.

SUMMARY OF THE INVENTION

In accordance with one aspect of the present invention, there is provided a sprocket assembly for a bicycle comprising at least one larger diameter sprocket having a plurality of teeth of an equal distance formed on an outer periphery thereof, and at least one smaller diameter sprocket rotated in concert with the larger diameter sprocket and having a plurality of teeth of an equal distance formed on an outer periphery thereof.

A driving chain meshes with the plurality of teeth of the smaller diameter sprocket and is able to shift from a first center of a space defined between the teeth of one pair of adjacent teeth located at the smaller diameter sprocket to a second center of a space defined between the teeth of one pair of adjacent teeth located at the larger diameter sprocket.

A distance between the first and second centers is made substantially not equal to an integer multiple of the pitch of the driving chain such that the driving chain is bent between the first and second centers and is deflected from a moving direction thereof which is along a tangent line drawn from the first center of the smaller diameter sprocket, and such that the driving chain has a deflection point relative to the first and second centers and an included angle is defined between a first line passing through the first center and the deflection point and a second line passing through the first center and the second center.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
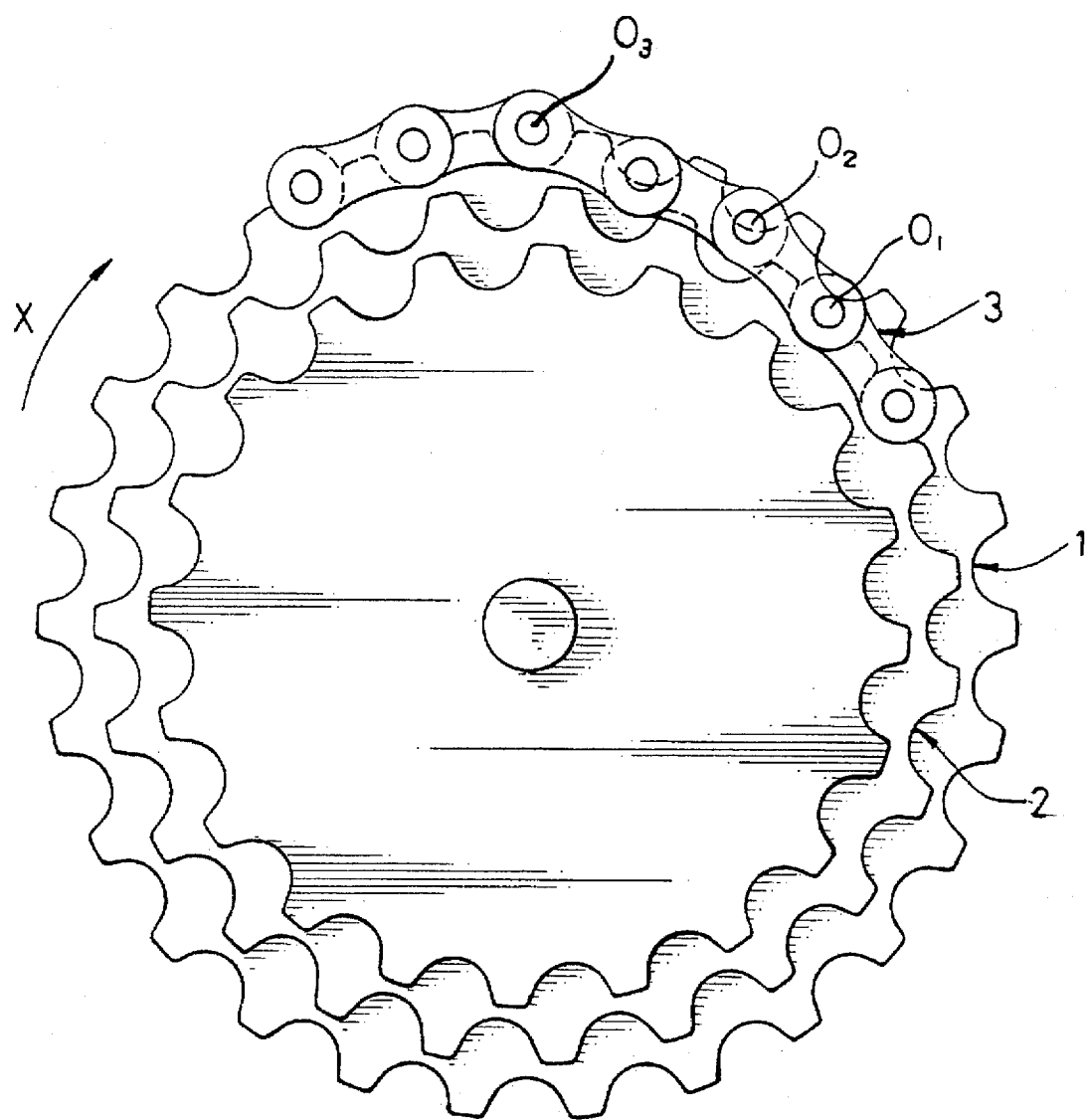
FIG. 1 is a front plan view of a multistage sprocket assembly in accordance with the present invention.
Figure 2:
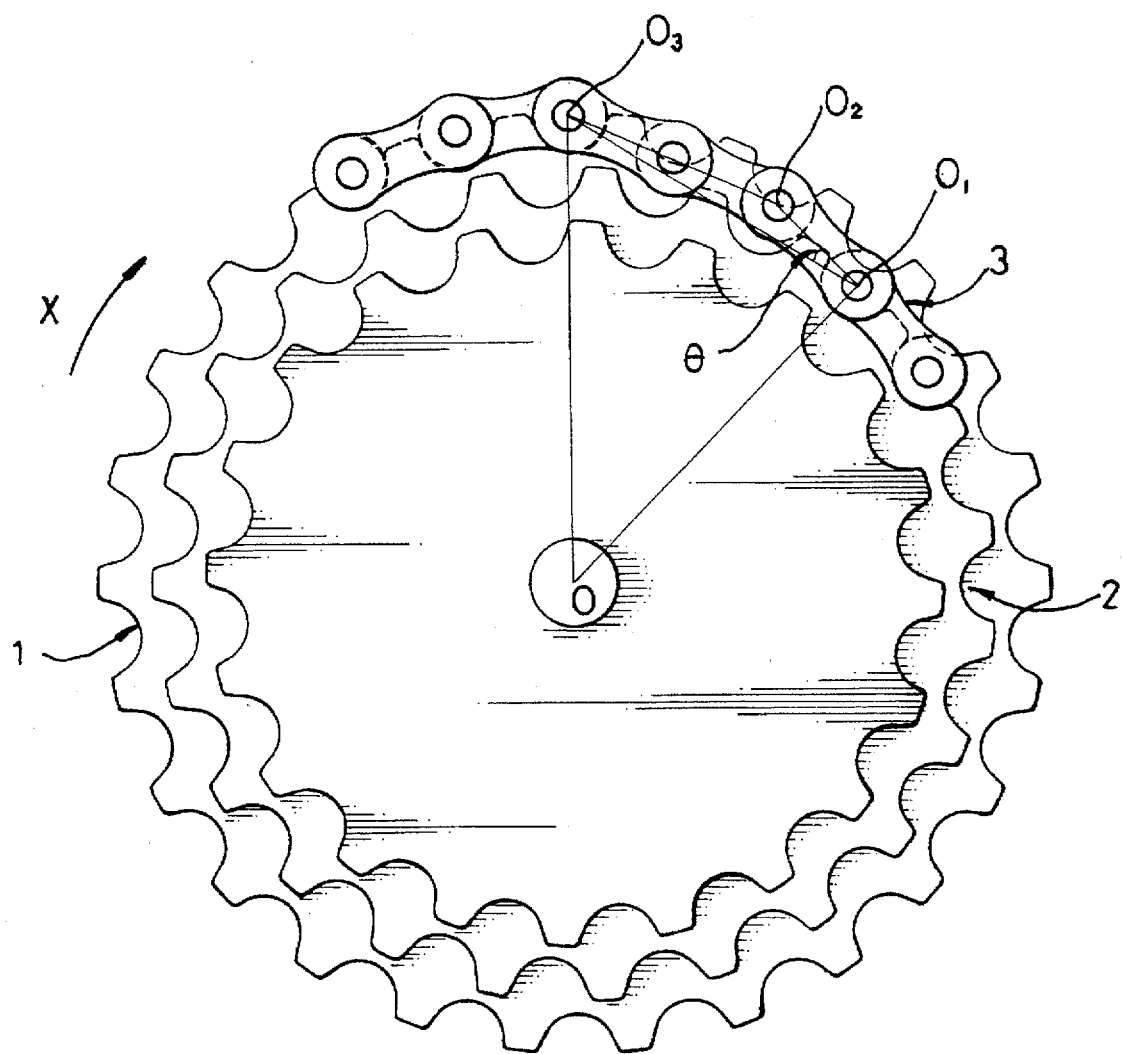
FIG. 2 is a front plan view of the multistage sprocket assembly as shown in FIG. 1, showing a deflection angle.

Referring to the drawings, and initially to FIGS. 1 and 2, a multistage sprocket assembly in accordance with the present invention is provided for a rear wheel of a bicycle and the like and comprises a larger diameter sprocket 1 having a plurality of teeth of an equal distance formed on an outer periphery thereof, and a smaller diameter sprocket 2 which is rotated in concert with the larger diameter sprocket 1 and has a plurality of teeth of an equal distance formed on an outer periphery thereof.

A driving chain 3 meshes with the plurality of teeth of the smaller diameter sprocket 2 and is able to shift from a first center $O_1$ of a space defined between the teeth of one pair of adjacent teeth located at the smaller diameter sprocket 2 to a second center $O_3$ of a space defined between the teeth of one pair of adjacent teeth located at the larger diameter sprocket 1.

A distance between the first and second centers $O_1$ and $O_3$ is made substantially not equal to an integer multiple of the pitch of the driving chain 3 such that the driving chain 3 is bent between the first and second centers $O_1$ and $O_3$ and is deflected from a moving direction thereof which is along a tangent line drawn from the first center $O_1$ of the smaller diameter sprocket 2, and such that the driving chain 3 has a deflection point $O_2$ relative to the first and second centers $O_1$ and $O_3$ and an included angle $\Theta$ is defined between a first line $O_1O_2$ passing through the first center $O_1$ and the deflection point $O_2$ and a second line $O_1O_3$ passing through the first center $O_1$ and the second center $O_3$.

Figure 3:
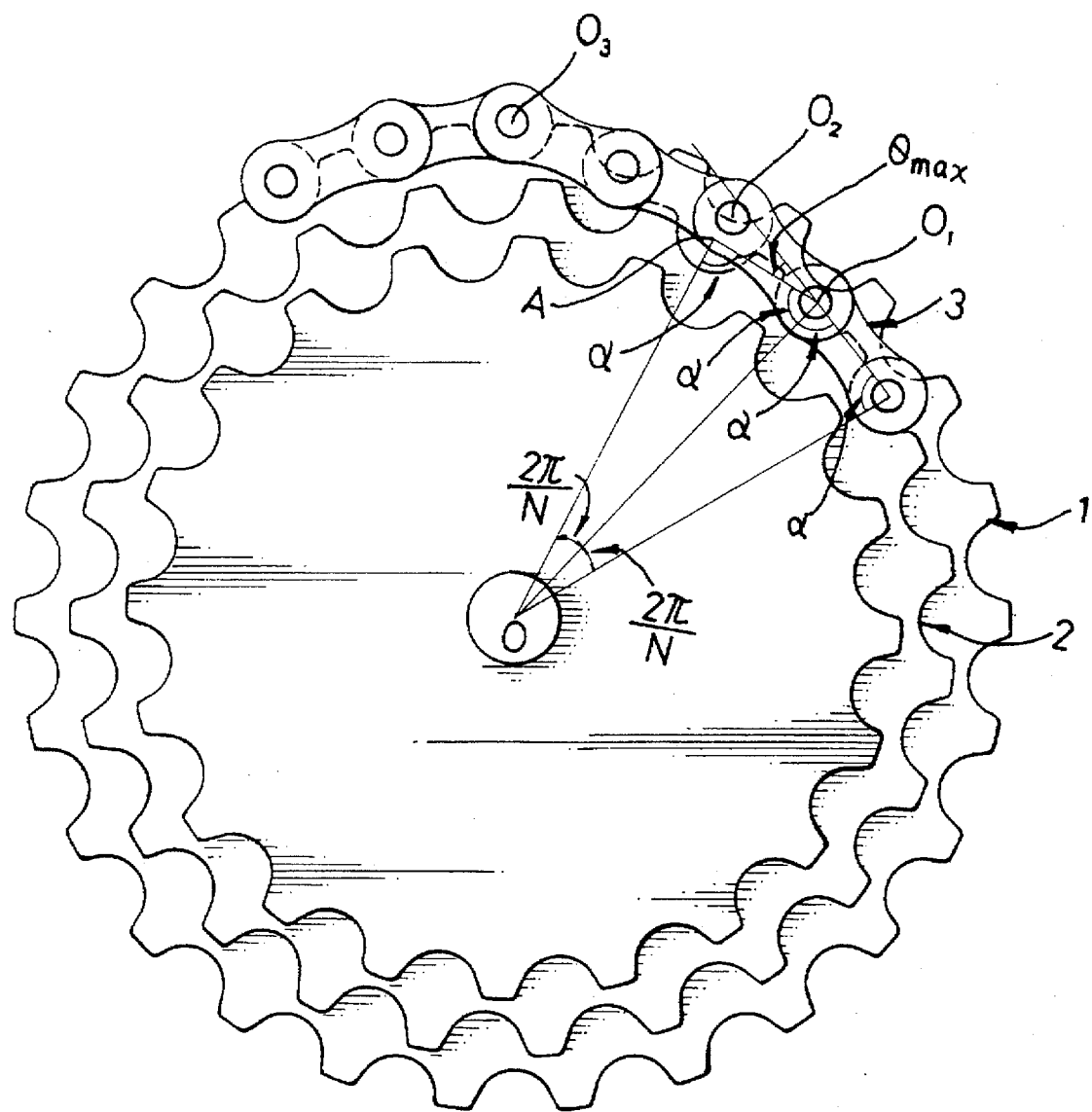
FIG. 3 is a front plan view of the multistage sprocket assembly as shown in FIG. 1, showing a maximum deflection angle.

Referring to FIG. 3, the total number of the teeth of the smaller diameter sprocket 2 is equal to N and the included angle $\Theta$ is greater than zero and smaller than $\Theta_{max}=2\pi/N$, where $\pi$ is a ratio of the circumference of a circle to its diameter and $\Theta_{max}$ is a maximum of the included angle. The maximum included angle $\Theta_{max}$ is determined as follows.

As clearly shown in FIG. 3, point A is a center of a space defined between the teeth of one pair of adjacent teeth located at the smaller diameter sprocket 2 and is located adjacent to the first center $O_1$. Points A, $O_1$ and O which is a center of the smaller diameter sprocket 2 are arranged to form an isosceles triangle comprising two equal angles $\alpha$ and a central angle $2\pi/N$. Because the total angle of a triangle is equal to $\pi$, i.e., $2\alpha+2\pi/N=\pi$, so the value of $\alpha$ is equal to $\frac{1}{2}(\pi-2\pi/N)$. As shown in FIG. 3, $\Theta_{max}+2\alpha=\pi$. So, $\Theta_{max}=\pi-2\alpha-2\pi/N$. Therefore, the maximum angle is $\Theta_{max}=2\pi/N$.

From the above-mentioned description, the included (or deflection) angle $\Theta$ of the driving chain 3 is limited to greater than zero and will not exceed $2\pi/N$.

In operation, referring to FIG. 2, the driving chain 3 initially meshes with the smaller diameter sprocket 2 and is moved therewith in a driving rotation direction as shown in arrow X. When the driving chain 3 mesh with the smaller diameter sprocket 2 is intended to be displaced by a derailleur (not shown) to be switched to the larger diameter sprocket 1, the driving chain 3 will be bent and deflected between the first center $O_1$ of the smaller diameter sprocket 2 and the second center $O_3$ of the larger diameter sprocket 1, thereby forming the deflection point $O_2$ between the first and second centers $O_1$ and $O_3$ and forming the deflection angle $\Theta$ such that the driving chain 3 is smoothly switched from the smaller diameter sprocket 2 to the larger diameter sprocket 1.

It is to be noted that, line connecting point $O_1$ and point $O_2$ represents the driving chain 3 is disposed in a lift status where the driving chain 3 is lifted from the smaller diameter sprocket 2 to a level and line connecting point $O_2$ and point $O_3$ represents the driving chain 3 is disposed in an engaging status where the driving chain 3 transmitted from the smaller diameter sprocket 2 smoothly meshes teeth of the larger diameter sprocket 1 via the chain guide portion 5.

Accordingly, by such an arrangement, the distance between the first and second centers $O_1$ and $O_3$ is not equal to an integer multiple of the pitch of the driving chain 3 such that the driving chain 3 is initially lifted and deflected to a higher level automatically and then smoothly meshes with teeth of the larger diameter sprocket 1 without riding thereon, thereby greatly eliminating noise generated during engaging process.

It should be clear to those skilled in the art that further embodiments of the present invention may be made without departing from the teachings of the present invention.

We claim:

1. A sprocket assembly for a bicycle comprising at least one larger diameter sprocket having a plurality of teeth of an equal distance formed on an outer periphery thereof, at least one smaller diameter sprocket rotated in concert with said larger diameter sprocket and having a plurality of teeth of an equal distance formed on an outer periphery thereof, a driving chain meshing with said plurality of teeth of said smaller diameter sprocket and being able to shift from a first center of a space defined between the teeth of one pair of adjacent teeth located at the smaller diameter sprocket to a second center of a space defined between the teeth of one pair of adjacent teeth located at the larger diameter sprocket, a distance between said first and second centers being not equal to an integer multiple of the pitch of said driving chain such that said driving chain is bent between said first and second centers and is deflected from a moving direction thereof which is along a tangent line drawn from said first center of said smaller diameter sprocket, and such that a deflection point is provided on said driving chain between said first and second centers so that a first line passing through said first center and said deflection point, and a second line passing through said first center and said second center will intersect with an included angle formed therebetween.

2. The sprocket assembly in accordance with claim 1, wherein a total number of the teeth of said smaller diameter sprocket is equal to N and said included angle is greater than zero and smaller than $(2\pi/N)$ where $\pi$ is a ratio of the circumference of a circle to its diameter.

* * * * *